(12) United States Patent
Negele et al.

(10) Patent No.: US 10,788,802 B2
(45) Date of Patent: Sep. 29, 2020

(54) SYSTEM FOR MANAGING ELECTRICAL CONSUMPTION IN AN APPLIANCE

(71) Applicant: SAGEMCOM BROADBAND SAS, Rueil Malmaison (FR)

(72) Inventors: Jean-Philippe Negele, Rueil Malmaison (FR); Anthony Reuche, Rueil Malmaison (FR); Massinissa Lalam, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/348,391

(22) PCT Filed: Nov. 22, 2017

(86) PCT No.: PCT/EP2017/080000
§ 371 (c)(1),
(2) Date: May 8, 2019

(87) PCT Pub. No.: WO2018/095947
PCT Pub. Date: May 31, 2018

(65) Prior Publication Data
US 2020/0057422 A1    Feb. 20, 2020

(30) Foreign Application Priority Data
Nov. 23, 2016   (FR) .................................... 16 61406

(51) Int. Cl.
*G05B 19/042*    (2006.01)
*H02J 13/00*    (2006.01)

(52) U.S. Cl.
CPC .......... *G05B 19/0428* (2013.01); *H02J 13/00* (2013.01); *G05B 2219/21154* (2013.01)

(58) Field of Classification Search
None
See application file for complete search history.

(56) References Cited

U.S. PATENT DOCUMENTS 6,665,806 B1    12/2003  Shimizu
2006/0141968 A1   6/2006  Masaki
(Continued)

OTHER PUBLICATIONS

Mar. 6, 2018 International Search Report issued in International Patent Application No. PCT/EP2017/080000.

*Primary Examiner* — Ryan A Jarrett
(74) *Attorney, Agent, or Firm* — Oliff PLC; R. Brian Drozd

(57) ABSTRACT

Some appliances, normally supplied by a mains supply, also comprise an emergency supply by batteries able to take over from the mains supply. The batteries used by the emergency supply are generally protected by a fuse. These appliances are liable to consume greater than what could be supplied by the batteries of the emergency supply. When there is a break in the mains electrical supply, it is then preferable to limit the current consumed by the appliance in order not to damage the fuse protecting said batteries. However, the fuses are hardware modules having a reaction time of a few hundreds of milliseconds. If it is wished not to damage the fuse, it is therefore essential to reduce the current consumption of the appliance within a time less than the reaction time of the fuse. The invention relates to a system and method for instantaneously reducing the electrical consumption of an appliance in the event of a break in the mains supply.

15 Claims, 5 Drawing Sheets

(56) References Cited

U.S. PATENT DOCUMENTS

| | | | |
|---|---|---|---|
| 2012/0181869 A1* | 7/2012 | Chapel | H02J 9/06 307/64 |
| 2016/0170396 A1* | 6/2016 | Wang | H02M 7/23 700/295 |
| 2016/0187960 A1* | 6/2016 | Yen | H02J 7/0029 713/323 |
| 2016/0233555 A1* | 8/2016 | Pedtke | H02J 7/0031 |

* cited by examiner

SYSTEM FOR MANAGING ELECTRICAL CONSUMPTION IN AN APPLIANCE

The invention relates to a system for managing electrical consumption in an appliance comprising a battery protected by a fuse, the appliance being able to be supplied electrically by a mains supply or by the battery, the supply by the battery being intended to take over from the mains supply in the event of a break in the mains supply. The invention also relates to a method for managing the electrical consumption of said appliance implemented by said appliance.

Some appliances, such as internet gateways, comprise emergency batteries enabling them to continue to function despite a break in the mains supply.

The emergency batteries have internal protections for protecting the appliances. These protections are implemented among other things by fuses. Sizing these fuses is a sensitive point when designing appliances. This is because the emergency batteries are considered to be a current source. This current source may be high or limited. A high current source involves mechanical design constraints in the appliances concerned. Thus, for an appliance that is to comprise a high energy source, it may be necessary to provide a fire-protection casing and thus to reduce (or even eliminate) ventilation openings in mechanical walls. The consequence of this is preventing natural convection and requires an addition of a forced ventilation system, which is generally considered to be unacceptable for some appliances such as gateways. An appliance that may comprise a limited-power energy source can implement ventilation holes. Using a fuse having a low current limit makes it possible to consider the batteries to be a limited-power current source and thus to alleviate the mechanical design constraints.

These mechanical design constraints mean that, in normal operation, that is to say when they are supplied by the mains, some appliances are liable to consume energy greater than what could be supplied by the emergency batteries. When the mains electrical supply is cut off (when changing to emergency batteries), it is then preferable to limit the current consumed by the appliance in order not to irreversibly damage the fuse protecting the emergency batteries. However, fuses are hardware modules having a reaction time of a few hundreds of milliseconds. If it is wished not to damage a fuse, it is therefore essential to reduce the current consumption of the appliance in a time less than the reaction time of the fuse. However, it is desirable for this reduction in current consumption to be transparent to a user of the appliance. In other words, the user must be able to use a majority of or even all the functionalities offered normally by the appliance. A reduction in the performance of the appliance is however acceptable.

There exists a significant prior art in the field of methods enabling an appliance to adapt its current consumption to electrical supply conditions. However, these methods use a software part, which means that these methods are not capable of instantaneously reacting to a change in electrical supply conditions or in any event in a time less than the reaction time of a fuse.

When an appliance involved in a change to a battery supply is a communicating appliance, such as a gateway, a reduction in the performance of the appliance does not solely have an impact on the appliance. This is because remote equipment with which the appliance is connected may also be impacted by the reduction in the performance of said appliance.

It is desirable to overcome these drawbacks of the prior art. It is in particular desirable to propose a system and a method for instantaneously reducing the electrical consumption in an appliance comprising emergency batteries so as to preserve the fuse protecting these batteries. Moreover, the reduction in electrical consumption must preferably be transparent to a user, or at least to have a limited impact on the functionalities offered by the appliance. In addition, since the break in the mains supply may be of indefinite duration, it is preferable also to provide a solution for saving on the energy contained in the emergency batteries after the mains supply is cut off.

It is also desirable to propose a system and a method that are simple to implement at low cost.

According to a first aspect of the present invention, the present invention relates to a system for managing electrical consumption in an appliance comprising a battery protected by an emergency fuse able to withstand a maximum supply current to the appliance for a predefined period, the appliance being able to be supplied electrically by a mains supply or by the battery, the battery supply being intended to take over from the mains supply in the event of a break in the mains supply, the system comprising means for detecting a break in the mains supply and means for reducing the electrical consumption of the appliance. The means for detecting a break in the mains supply and the means for reducing the electrical consumption of the appliance are able to be used independently of any interpretation of machine instructions and to react in a time less than the predefined time, the means for reducing the electrical consumption of the appliance making it possible to obtain a predefined reduction in electrical consumption of the appliance ensuring that the appliance consumes a supply current smaller than the maximum supply current that the safety fuse can withstand.

Thus the system makes it possible not to damage the safety fuse in the event of a break in the mains supply.

According to one embodiment, the means for detecting a break in the mains supply comprise means for comparing the voltage representing a supply voltage of the appliance with a predefined reference voltage, a break in the mains supply being detected when the predefined reference voltage is higher than the voltage representing the supply voltage of the appliance.

According to one embodiment, the means for reducing the electrical consumption of the appliance are controlled by the means for detecting a break in the mains supply and open an electrical supply circuit of at least one predefined hardware module included in the appliance when a break in the mains supply is detected.

According to one embodiment, the electrical supply circuit of a hardware module of the appliance can be opened by the means for reducing the electrical consumption only when a module of the appliance, referred to as a lock, associated with this hardware module is in an activated mode and cannot be opened when said lock is in a deactivated mode, each lock being configured in the activated or deactivated mode by a processor of the appliance using machine instructions.

According to one embodiment, following the opening of the supply circuit of each predefined hardware module making it possible to obtain the predefined reduction in electrical consumption of the appliance, the processor is able to cause the opening of the supply circuit of other hardware modules of the appliance by activating a lock associated with each other hardware module.

According to a second aspect of the invention, the invention relates to a method for managing electrical consumption in an appliance comprising a battery protected by a safety fuse able to withstand a maximum supply current of the appliance for a predefined period, the appliance being able to be supplied electrically by a mains supply or by the battery, the supply by the battery being intended to take over from the mains supply in the event of a break in the mains supply. The method comprises the following steps implemented independently of any interpretation of machine instructions in a time less than the predefined period: detecting a break in mains supply; and cutting off the electrical supply of at least one hardware module of the appliance so as to obtain a predefined reduction in electrical consumption of the appliance ensuring that the appliance consumes a supply current lower than the maximum supply current that the safety fuse can withstand.

According to one embodiment, the appliance comprises a plurality of wireless communication modules each managing at least one wireless communication connection, each wireless connection being associated with at least one remote item of equipment, the method comprises: checking whether the mains supply of the appliance is re-established; when the mains supply is not re-established: obtaining information representing a first wireless communication module that may be cut off and transmitting, to each remote item of equipment associated with a wireless connection managed by the first wireless communication module, a message comprising information representing said wireless connection; cutting off the electrical supply to the first wireless communication module; and regularly checking whether the mains supply has been re-established.

According to one embodiment, said message further comprises a list indicating, to each remote item of equipment associated with a wireless connection managed by the first wireless communication module, at least one wireless connection to migrate to.

According to one embodiment, the wireless connection to migrate to is an existing wireless connection managed by a second wireless communication module or a temporary wireless connection created by a second wireless communication module following the detection of the break in mains supply.

According to one embodiment, the method further comprises: saving an identifier of each remote item of equipment associated with a wireless connection managed by the first wireless communication module; and using the saved identifiers to enable a second wireless communication module to treat as a priority each remote item of equipment to which said identifiers relate if they attempt to migrate to a wireless connection managed by said second wireless communication module.

According to one embodiment, when the mains supply is re-established, the method further comprises: allowing the electrical resupply of each hardware module of the appliance cut off when the break in the mains supply is detected; and transmitting a message to each remote item of equipment involved in the break in mains supply of the first wireless communication module indicating that each wireless connection managed by the first wireless communication module has been reactivated.

According to one embodiment, each message is transmitted to each remote item of equipment involved in the cutting off of the first wireless communication module according to a unicast communication mode or according to a multicast communication mode or according to a broadcast communication mode.

According to one embodiment, the broadcast communication mode is used when a break in mains supply is detected, and the unicast communication mode or the multicast communication mode is used when a reestablishment of the mains supply is detected.

According to a third aspect of the invention, the invention relates to an appliance comprising a system according to the first aspect and means for implementing the method according to the second aspect.

According to a fourth aspect of the invention, the invention relates to a computer program comprising instructions for the implementation, by an appliance, of the steps of the method according to the second aspect when said program is executed by a processor of said appliance.

According to a fifth aspect of the invention, the invention relates to storage means storing a computer program comprising instructions for the implementation, by an appliance, of the steps of the method according to the second aspect when said program is executed by a processor of said appliance.

The features of the invention mentioned above, as well as others, will emerge more clearly from a reading of the following description of an example embodiment, said description being given in relation to the accompanying drawings, among which:

The invention is described hereinafter in an internet gateway context. The invention could however be implemented in another context, in any appliance comprising a battery able to take over from a mains supply, the appliance being communicating or not. Moreover, part of the invention relates to activations/deactivations of a Wi-Fi module and management of remote equipment associated with Wi-Fi connections managed by these Wi-Fi modules. The invention could also be suitable for communication modules other than Wi-Fi modules, such as for example Bluetooth or ZigBee modules.

Figure 1:
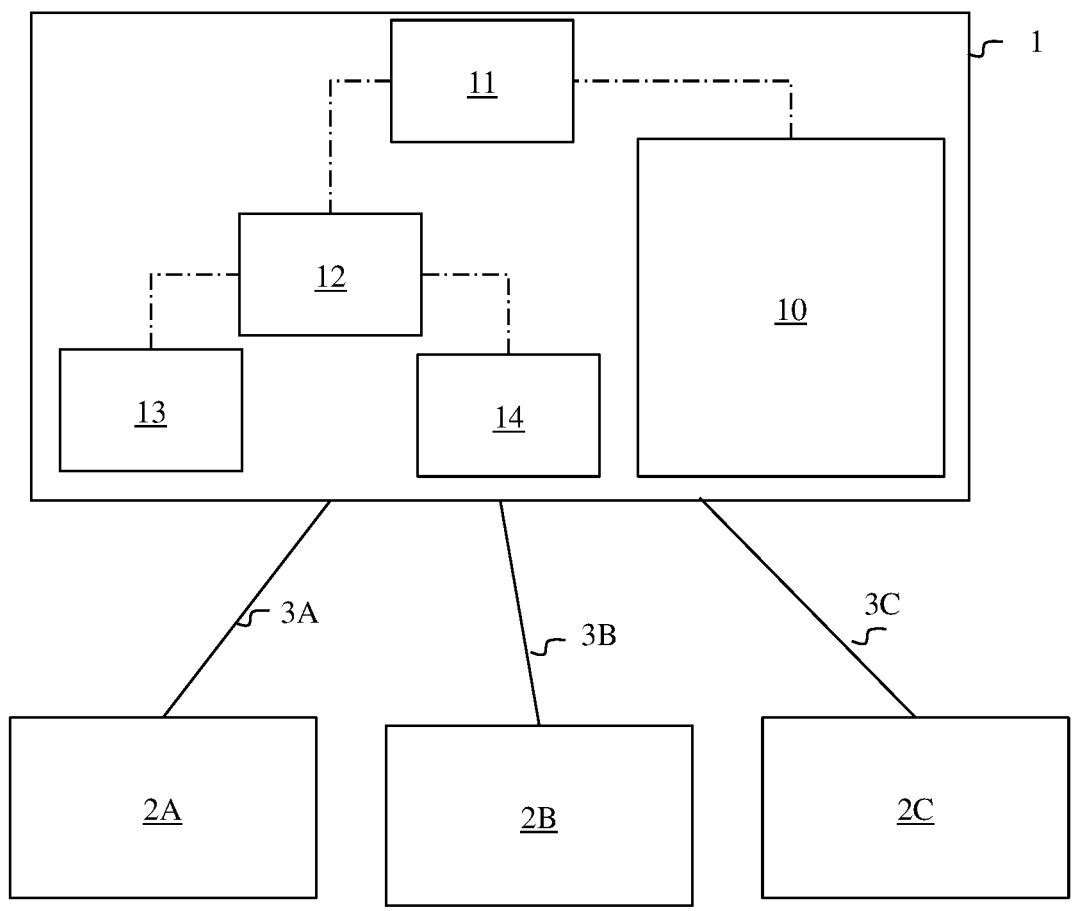
FIG. 1 illustrates schematically an appliance implementing the invention.

FIG. 1 illustrates schematically an appliance 1 implementing the invention.

In the example in FIG. 1, the appliance 1 is a gateway. The gateway 1 comprises a core system 10 that we detail in relation to FIGS. 2 and 3 managing all the functionalities of the gateway 1, a mains supply module 13, a battery supply module 14, and a transition module 12 providing change from the mains supply to the battery supply when the mains supply is cut off and a change from the battery supply to the mains supply when the mains supply is reactivated. The gateway 1 also comprises an electrical-consumption management system 11 that we detail hereinafter in relation to FIGS. 4 and 5.

In FIG. 1, remote items of equipment 2A, 2B and 2C are connected to the gateway 1, for example by Wi-Fi connections 3A, 3B and 3C.

It will be noted that, in FIG. 1 (and in FIGS. 4 and 5 that we describe hereinafter), solid lines represent data communication lines whereas dot-and-dash lines represent electrical supply lines.

Figure 2:
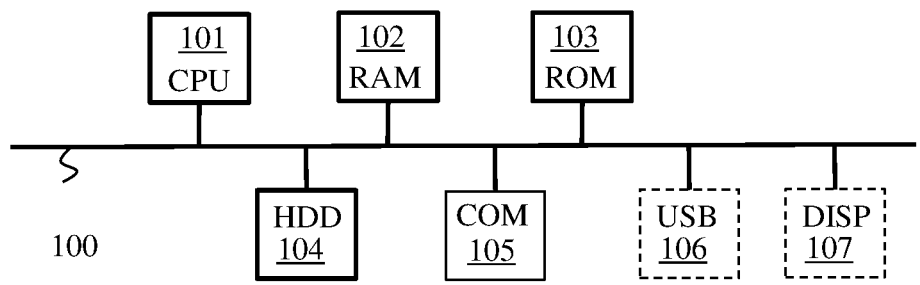
FIG. 2 illustrates schematically an example of hardware architecture of a system wherein the electrical consumption is managed by a system for managing the electrical consumption according to the invention.

FIG. 2 illustrates schematically an example of hardware architecture of the core system 10, the electrical consumption of which is managed by an electrical-consumption management system 11 according to the invention.

According to the example of hardware architecture depicted in FIG. 2, the core system 10 then comprises, connected by a communication bus 100: a processor or CPU (central processing unit) 101; a random access memory (RAM) 102; a read only memory (ROM) 103; a storage unit such as a hard disk or a storage medium reader such as an SD (secure digital) card reader 104; a communication interface 105 enabling the appliance 10 to communicate with other appliances or devices. We detail the communication module 105 in relation to FIG. 3. The core system 10 further comprises a USB (universal serial bus) module 106 able to read, for example, a USB key, and a display module 107 such as a liquid crystal screen.

The processor 101 is capable of executing instructions loaded into the RAM 102 from the ROM 103, from an external memory (not shown), from a storage medium (such as an SD card), or from a communication network. When the appliance 10 is powered up, the processor 101 is capable of reading instructions from the RAM 102 and executing them. These instructions form a computer program causing the implementation by the processor 101 of steps of the methods described below in relation to FIGS. 6 and 8.

Figure 6:
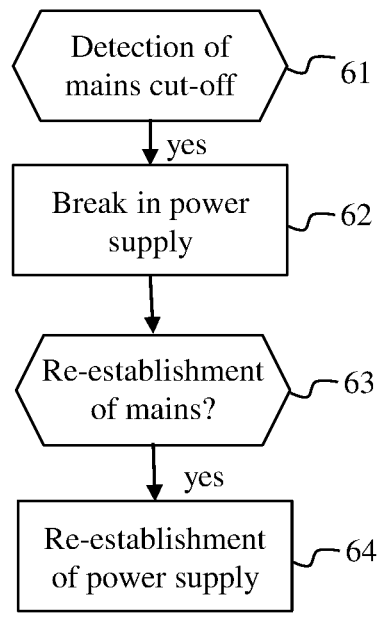
FIG. 6 illustrates schematically a first example of a method for managing electrical consumption according to the invention.
Figure 8:
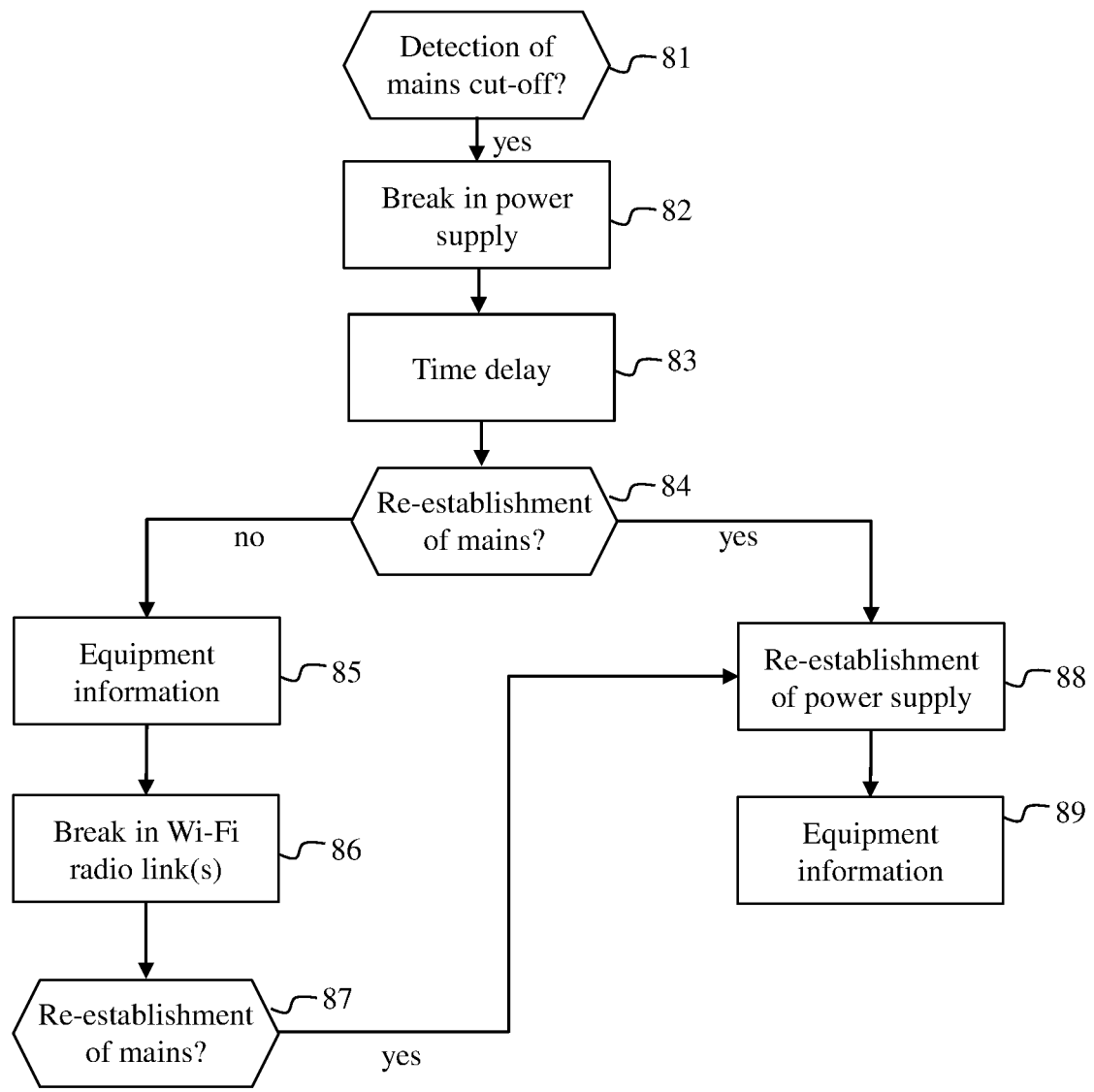
FIG. 8 illustrates schematically a second example of a method for managing electrical consumption according to the invention.

The steps of the methods described in relation to FIGS. 6 and 8 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
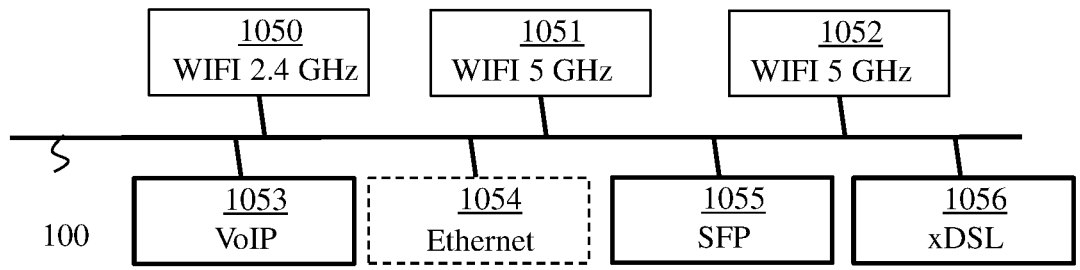
FIG. 3 illustrates schematically a detail of a communication module wherein the electrical consumption is managed by a system for managing electrical consumption according to the invention.

FIG. 3 illustrates schematically a detail of the communication module 105 the electrical consumption of which is managed by an electrical-consumption management system 11 according to the invention.

The communication module 105 comprises, connected by the communication bus 100, a first Wi-Fi module 1050 implementing the IEEE standards 802.11b, g or n, a second Wi-Fi module 1051 implementing the IEEE standard 802.11a, n or ac and a third Wi-Fi module 1052 identical to the Wi-Fi module 1051. The remote items of equipment 2A, 2B and 2C are connected to the gateway 1 by Wi-Fi connections 3A, 3B and 3C managed respectively by the Wi-Fi modules 1050, 1051 and 1052. Each Wi-Fi module is able to manage at least one Wi-Fi connection commonly referred to as a BSS (Basic Service Set). A remote item of equipment that manages to connect to a BSS is said to be associated with this BSS. The remote item of equipment has then access to the services offered by the gateway by means of the BSS with which it is associated. In the example described in relation to FIG. 1, in the case of mains supply, the remote item of equipment 2A is associated with the BSS 3A (i.e. with the Wi-Fi connection 3A) managed by the Wi-Fi module 1050. The remote item of equipment 2B is associated with the BSS 3B (i.e. with the Wi-Fi connection 3B) managed by the Wi-Fi module 1051. The remote item of equipment 2C is associated with the BSS 3C (i.e. with the Wi-Fi connection 3C) managed by the Wi-Fi module 1052.

The communication module 105 also comprises a module 1053 for voice communication on an IP (internet protocol) compatible network, commonly referred to as VoIP (Voice over IP), an Ethernet module 1054, an SFP (small form-factor pluggable) module 1055 and an xDSL (ADSL, SDSL, etc.) (asymmetric/symmetric digital subscriber line) module 1056.

In an example of use of the gateway when there is a break in the mains supply, it is considered that the Voice over IP functionality must be preserved in order to enable a user to contact help even in the case of a break in the mains supply. In order to ensure this functionality, some hardware modules of the core system 10 are essential, i.e. the Voice over IP functionality could not be provided without these hardware modules. Other hardware modules, such as the Wi-Fi modules, may be degraded but must remain functional.

The hardware modules of the core system 10 described in relation to FIGS. 2 and 3 can be classified in three categories:

the hardware modules providing critical functions, grouped together hereinafter under the term critical modules, that is to say providing basic functions of the gateway 1 or essential for ensuring the Voice over IP functionality. These are the communication bus 100, the processor 101, the random access memory RAM 102, the read only memory ROM 103, the storage unit 104, the VoIP module 1053, the SFP module 1055 and the xDSL module 1056;

the hardware modules providing non-necessary functions, grouped together hereinafter under the term optional modules, that is to say ones that a user can do without during a break in mains supply. These are the USB module 106, the display module 107 and the Ethernet module 1054;

the hardware modules providing secondary functions, hereinafter referred to as secondary modules, that is to say functions that must be preserved but which may be degraded. These are the Wi-Fi modules 1050, 1051 and 1052.

One objective of the electrical-consumption management system 11 is to act on the optional modules and the secondary modules in order to reduce the electrical consumption of the gateway when there is a break in the mains supply.

Figure 4:
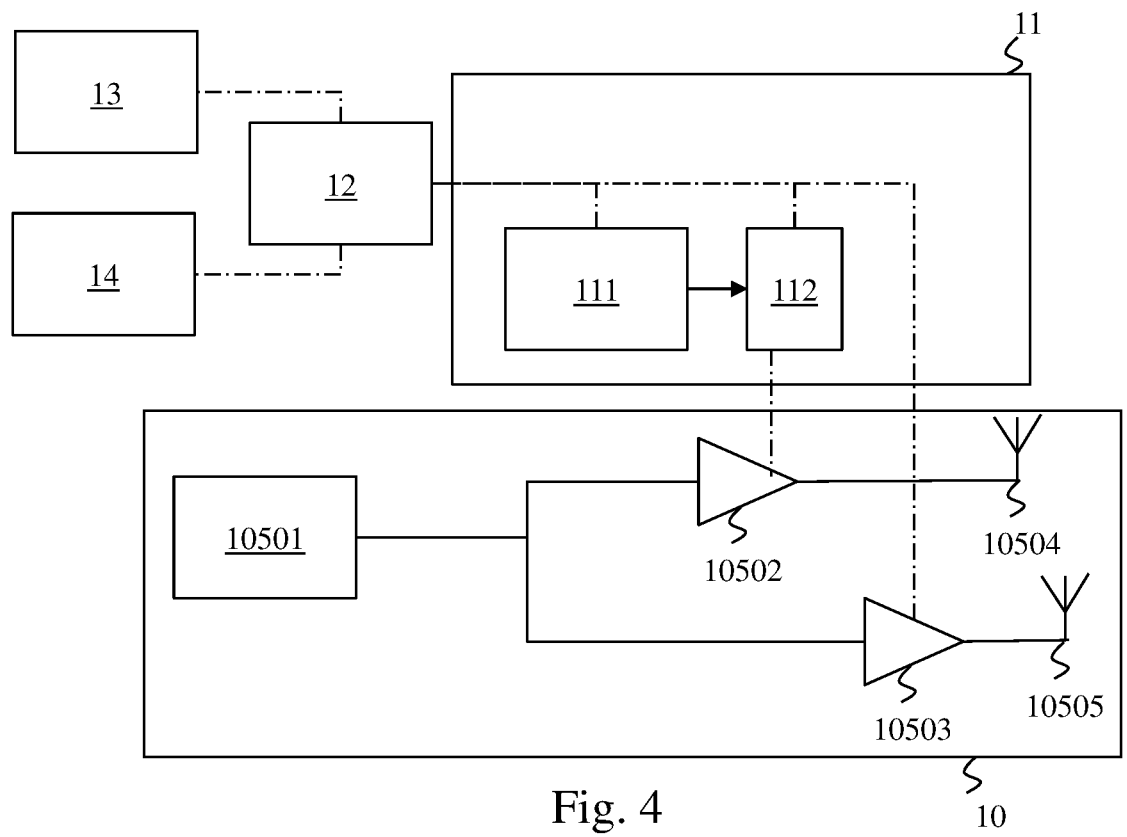
FIG. 4 illustrates schematically a first example of a system for managing electrical consumption according to the invention.

FIG. 4 illustrates schematically a first example of an electrical-consumption management system 11 according to the invention.

In the example in FIG. 4, the electrical-consumption management system 11 is placed in a use context. Therefore in FIG. 4 there are the mains supply module 13, the battery supply module 14, the transition module 12 and a simplified version of the core system 10 in which only the Wi-Fi module 1050 is shown. The battery supply module 14 comprises at least one battery. Each battery of the battery supply module 14 is protected by a fuse, referred to hereinafter as the safety fuse, able to withstand a maximum supply current of the gateway 1 for a predefined period T. The Wi-Fi module 1050 is shown in detailed form comprising a processing module 10501, an antenna 10504 and an antenna 10505, and, associated respectively with the antenna 10504, a power amplifier 10502 and, with the antenna 10505, a power amplifier 10503. It is known that a power amplifier consumes electrical energy. A significant reduction in consumption would therefore be obtained if this type of hardware module were cut off.

The electrical-consumption management system 11 comprises a module 111 for detecting a break in the mains supply and a module 112 for reducing electrical consumption. The module 111 for detecting a break in the mains supply and the module 112 for reducing electrical consumption are completely hardware modules. The modules 111 and 112 therefore function independently of any interpretation of machine instructions (i.e. these are not software modules and do not receive software instructions), and are able to react in a time less than the predefined period T.

The module 111 for detecting a break in the mains supply monitors an input voltage of the gateway 1. When a break in the mains supply to the gateway 1 occurs, this input voltage falls. This drop can then be detected. The module 111 for detecting a break in the mains supply may be implemented in various forms.

Figure 7A:
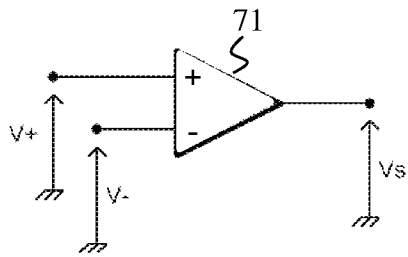
FIGS. 7A, 7B and 7C illustrate schematically three examples of modules for detecting a break in mains supply 111 suitable for the invention.
Figure 7B:
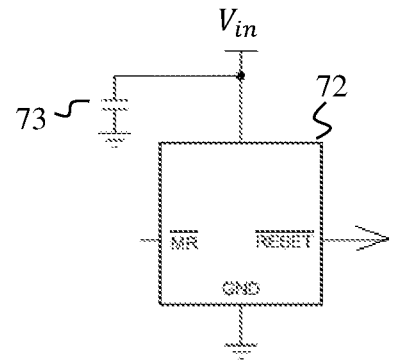
Figure 7C:
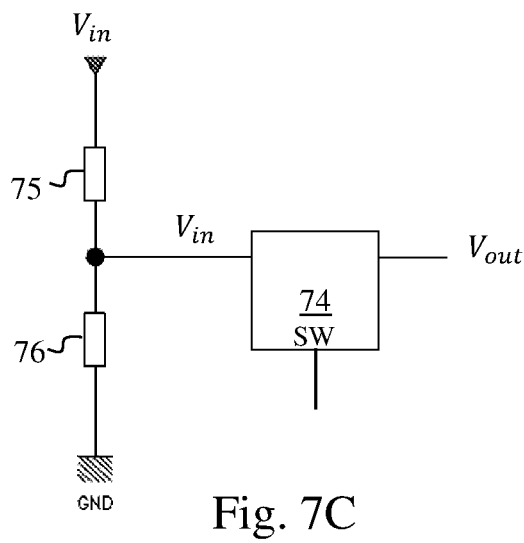

FIGS. 7A, 7B and 7C illustrate schematically three examples of modules 111 for detecting a break in the mains supply suitable for the invention.

In FIG. 7A, the module 111 for detecting a break in the mains supply is implemented by an operational amplifier 71 connected as a simple comparator. An input voltage V+ is compared with an input voltage V−. The voltage V+ represents the input voltage of the gateway 1 to be monitored. The voltage V− represents a voltage reference. The voltage reference is obtained via a voltage regulator, an output voltage (i.e. the reference voltage) of which is always the same whether the gateway is supplied by the mains supply module 13 or the battery supply module 14. An output (i.e. an output voltage) $V_s$ of the operational amplifier 71 depends on a sign of a subtraction between V+ and V−.

In FIG. 7B, the module 111 for detecting a break in the mains supply is implemented by a voltage monitor 72. The voltage monitor 72 comprises an output RESET that is set to zero when a monitored voltage $V_{in}$ drops below a reference voltage predefined in the voltage monitor 72.

In FIG. 7C, the module 111 for detecting a break in the mains supply is implemented by voltage divider bridge coupled to a logic gate 74. The voltage divider bridge is formed by a resistor 75 and a resistor 76 (for example respectively of 75 kΩ and 27 kΩ). An output $V_{out}$ of the logic gate 74 changes state when an input voltage $V_{in}$ coming from the voltage divider bridge and representing the voltage to be monitored passes below a predefined reference voltage.

The reduction in electrical consumption is obtained by cutting off the electrical supply to certain hardware modules included in the gateway 1. The electrical-consumption reduction module 112 provides these breaks in electrical supply. The electrical-consumption reduction module 112 may for example be implemented by a PMOS power transistor controlled by the output of the module 111 for detecting a break in the mains supply. The output of the module 111 for detecting a break in the mains supply therefore controls the PMOS power transistor and, in the event of a break in mains supply, causes opening of an electrical supply circuit of each hardware module that is to be cut off.

In the example in FIG. 4, when a break in mains supply is detected by the module 111, this detection causes a break in the electrical supply to the power amplifier 10502 by the module 112. The electrical supply circuit of the power amplifier 10502 is then opened by the module 112. Thus the functioning of the Wi-Fi module 1050 is degraded since only one antenna of this module has a supplied power amplifier. The other antennas then function without a power amplifier, which degrades the performances of the receiver.

In one embodiment, each power amplifier included in the Wi-Fi modules 1050, 1051 and 1052 comprises an activation/deactivation input for activating or deactivating said power amplifier. In this embodiment, the output of the module 111 for detecting a break in the mains supply directly deactivates the power amplifier 10502 via the activation/deactivation input thereof. Each activation/deactivation input therefore constitutes means for reducing the electrical consumption of the gateway 1.

The Wi-Fi module 1050 forms part of the secondary modules the functioning of which can be degraded. From a global point of view, when a break in the electrical supply is detected by the module 111, the module 112 cuts off the electrical supply to all the optional modules and degrades the functioning of some secondary modules so as to ensure that the gateway consumes a supply current lower than the maximum supply current that the safety fuse can withstand. In the embodiment described in relation to FIG. 4, the secondary modules the function of which is degraded are predefined. Moreover, the way in which the functioning of these modules is degraded is also predefined. For example, when the secondary modules are the Wi-Fi modules 1050, 1051 and 1052, the degradation consists of supplying only one power amplifier for each Wi-Fi module. In this way, each Wi-Fi module can effectively use only one antenna.

Figure 5:
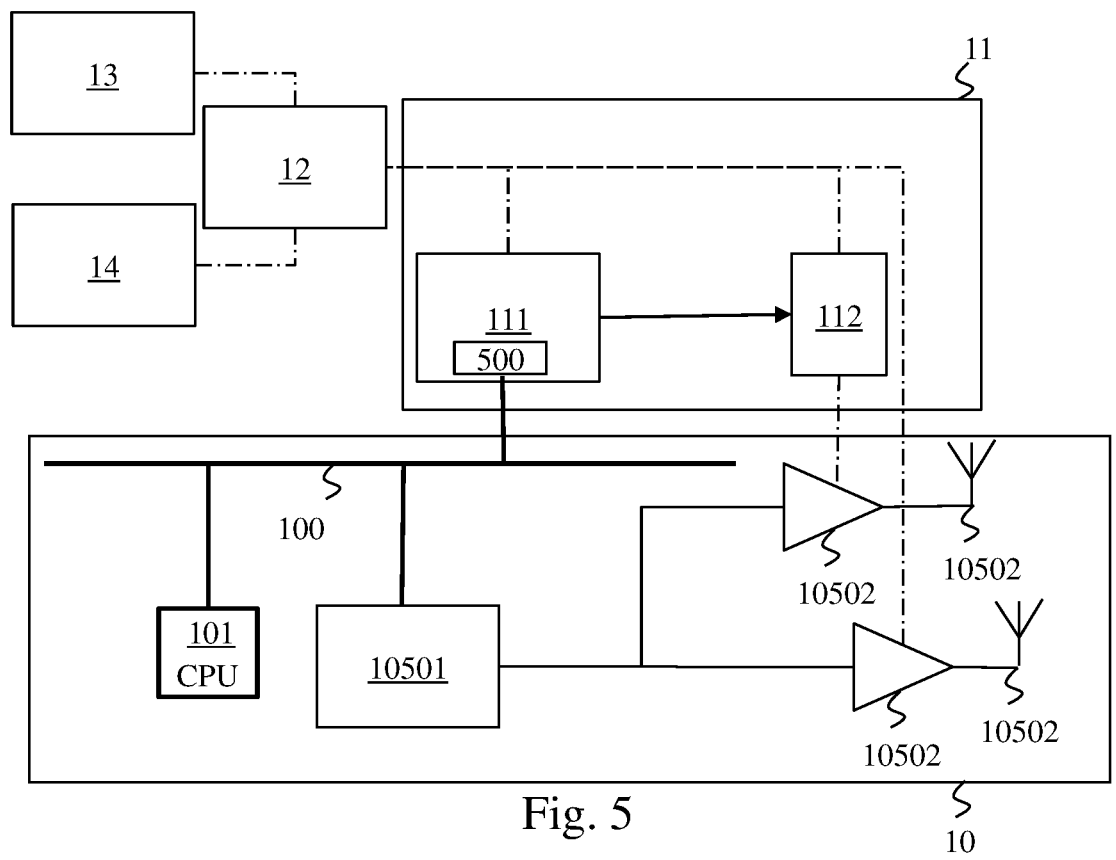
FIG. 5 illustrates schematically a second example of a system for managing electrical consumption according to the invention.

FIG. 5 illustrates schematically a second example of an electrical-consumption management system 11 according to the invention.

FIG. 5 differs from FIG. 4 in that the simplified version of the core system 10 in which only the Wi-Fi module 1050 is shown this time depicts the processor 101 and the communication bus 100.

Moreover, the module 111 for detecting a break in the mains supply comprises a module 500, referred to as a lock. The lock 500 makes it possible to enable or not enable a break in electrical supply to a hardware module of the gateway 1. Thus, if a break in mains supply is detected by the module 111, the electrical supply to a hardware module of the gateway 1 is actually cut by the module 112 only if the lock 500 corresponding to this hardware module indicates that this break in electrical supply is enabled. The electrical-supply circuit of a hardware module of the gateway 1 can therefore be opened by the module 112 only if the lock 500 associated with this hardware module is in an activated mode and cannot be opened when said lock 500 is in a deactivated mode.

When the module 111 for detecting a break in the mains supply is the voltage monitor 72 depicted in FIG. 7B, the lock 500 is a logic input MR of the voltage monitor 72. This logic input, when it is activated, enables the output RESET to go to zero when the monitored voltage $V_{in}$ drops below a predefined reference voltage and, when it is deactivated, prevents the output RESET from going to zero when the monitored voltage $V_{in}$ drops below the predefined reference voltage.

When the module for detecting a break in the mains supply 111 is the voltage divider bridge coupled to the logic gate shown in FIG. 7C, the lock 500 is a logic input SW of the logic gate 74. When this logic input SW is activated, it enables the output $V_{out}$ of the logic gate 74 to change state when the input voltage $V_{in}$ goes below the predefined reference voltage. When the logic input SW is deactivated, this prevents the output $V_{out}$ of the logic gate 74 from changing state when the input voltage $V_{in}$ goes below the predefined reference voltage.

In one embodiment, the lock 500 is a logic module (based for example on logic AND/OR gates) independent of the module 111. When the lock 500 is deactivated, it prevents the module 111 from causing a power cut by the module 112. When the lock 500 is activated, it enables the module 111 to cause a power cut by the module 112.

In one embodiment, the lock 500 is connected to the processor 101 by means of the communication bus 100. In this embodiment, it is the processor 101 that determines whether the lock must be in an activated mode or a deactivated mode and which configures the lock 500 using machine instructions. The lock 500 is configured by the processor 101 outside a time of changing from a mains supply to a battery supply. In other words, the lock 500 can be configured by the processor 101 before or after a change from a mains supply to a battery supply, but under no circumstances during this change.

In one embodiment, the electrical-consumption management system 11 comprises at least one module 111 for detecting a break in mains supply and, for each hardware device of the gateway 1 that can be subject to a break in an electrical supply, a module 112 for reducing electrical consumption and a lock 500. When the lock 500 is included in the module 111 for detecting a break in mains supply, the electrical-consumption management system 11 comprises a module 111 for detecting a break in mains supply for each hardware module of the gateway 1 that may be subject to a break in electrical supply. In this embodiment, each lock 500 is configured in activated mode or deactivated mode by the processor 101. This embodiment enables the processor 101 to control finely which hardware module of the gateway 1 must be subjected to a break in electrical supply. The locks of the optional modules are systematically activated so that the hardware modules concerned are systematically deactivated in the event of a break in mains supply. The locks of the secondary modules may be activated or deactivated adaptively according to predefined criteria.

In one embodiment, a configuration, hereinafter referred to as the predefined configuration, of the locks of the secondary modules, hereinafter referred to as secondary locks, makes it possible to obtain a predefined reduction in electrical consumption of the gateway 1. The predefined reduction in electrical consumption makes it possible to ensure that the gateway 1 does not consume a supply current higher than the maximum supply current that the safety fuse can withstand. When the gateway 1 is supplied by the mains supply module 13, the processor 101 places the secondary locks in the predefined configuration and activates the locks of the optional modules. Thus, when there is a break in mains supply, the electrical consumption of the gateway 1 is compatible with the safety fuse. It can therefore be stated that the activation of the locks is software since it is implemented by the processor 101 and the triggering of the electrical supply breaks is solely hardware since it depends only on each module 111 for detecting a break in mains supply, of each lock 500, the configuration of each lock 500 being fixed at the moment of a break in mains supply and of each electrical-consumption reduction module 112.

FIG. 6 illustrates schematically a first example of an electrical-consumption management method according to the invention.

In a step 61, each module 111 for detecting a break in mains supply which was awaiting a detection of a break in mains supply detects a break in mains supply.

In a step 62, following the detection of a break in mains supply, each module 111 for detecting a break in mains supply instantaneously causes the cutting off of electrical supply to each optional module and the degradation of the functioning of at least some of the secondary modules.

When the electrical-consumption management system 11 does not comprise a lock as described in relation to FIG. 4, each electrical-consumption reduction module 112 controlled by the output of a module 111 for detecting a break in mains supply causes the opening of the electrical supply circuit of a hardware module of the gateway 1 that is to be cut off.

When the electrical-consumption management system 11 comprises at least one lock 500 activated or not by the processor 101, as described in relation to FIG. 5, only the hardware modules of the gateway 1 associated with an activated lock 500 are cut off. This relates to the secondary modules associated with at least one activated secondary lock and the optional modules.

The gateway 1 remains in an operating mode in which it is supplied by battery, referred to as back-up mode, as long as the mains supply is not re-established.

As soon as the mains supply is re-established, this is detected by the module 111 for detecting a break in mains supply during a step 63.

In a step 64, following the detection of a re-establishment of the mains supply, each module 111 for detecting a break in mains supply instantaneously causes the reactivation of each hardware module cut off during step 62. Thus all the electrical supply circuits opened during step 62 are closed.

The predefined configuration makes it possible to ensure that the safety fuse is not damaged when there is a break in mains supply. The predefined configuration can be seen as an emergency configuration, able to preserve the gateway 1. However, though the preservation of the safety fuse is essential when there is a break in the mains supply, it is still advantageous to reduce the electrical consumption of the gateway 1 in order to increase the self-sufficiency of the gateway 1 when it is supplied by batteries.

Until then, in the predefined configuration, all the functionalities provided by critical or secondary modules of the gateway are preserved. To go further in the search for energy saving, it is possible to completely cut off some secondary modules, and in particular some Wi-Fi modules. However, cutting off a Wi-Fi module may cause disturbances in remote equipment connected to the BSS managed by the Wi-Fi module. To avoid this type of disturbance or at least to limit it, it is desirable to warn remote equipment associated with a BSS of any cutting off of this BSS;

propose to the remote equipment associated with a BSS intended to be cut off to switch to another BSS delivered by another Wi-Fi module, this BSS being able to be on another channel or on another band.

Preferentially, the two Wi-Fi modules (the Wi-Fi module intended to be cut off and the Wi-Fi module to which the remote equipment will switch) function on the same ISM band (e.g. 2.4 GHz or 5 GHz) in order to guarantee that all the remote equipment can support a communication on the BSS proposed. If such is not the case, the Wi-Fi module operating on a high ISM band (e.g. 5 GHz) is the one the cutting off of which is favoured, since it generally consumes more. However, if no equipment is associated with a Wi-Fi module when changing to battery, this Wi-Fi module is cut off as a priority, independently of the band on which it is functioning.

FIG. 8 illustrates schematically a second example of an electrical-consumption management method according to the invention.

The method described in relation to FIG. 6 has the sole purpose of avoiding damaging the safety fuse. The method described in relation to FIG. 8 makes it possible to achieve this same objective. It also makes it possible firstly to reduce the electrical energy consumption of the gateway 1 in back-up mode and secondly to limit the disturbances suffered by each item of remote equipment associated with a BSS that is to be deactivated.

It should also be noted that, whereas the method described in relation to FIG. 6 is purely hardware and involves no software step, the method described in relation to FIG. 8 comprises hardware steps and software steps. The hardware steps make it possible in particular to change instantaneously to back-up mode in the event of the mains supply being cut off without damaging the safety fuse.

In the method described in relation to FIG. 8, steps 81 and 82 are strictly identical to steps 61 and 62 already explained.

During a step 83 following step 82, the processor 101 waits for a time delay of a predefined duration.

At the end of this time delay, the processor 101 checks, during a step 84, whether the mains supply has been re-established. To do this, it checks the output value of the module 111 for detecting a break in mains supply.

When, during step 84, the processor 101 determines that the mains supply has not been re-established, the processor 101 passes to a step 85.

During step 85, the processor 101 obtains information representing Wi-Fi modules (and BSSs managed by these Wi-Fi modules) able to be cut off and transmits a message comprising information representing the BSSs concerned to remote equipment associated with these BSSs. For example, the information representing Wi-Fi modules able to be cut off indicates that the Wi-Fi module 1052 may be deactivated. The processor 101 transmits to the remote equipment 2C information indicating that the BSS 3C will be stopped. Step 85 is detailed hereinafter.

In a step 86, the processor causes the cutting off of the electrical supply to each Wi-Fi module that can be cut off. To do this, it activates each lock associated with an electrical-consumption reduction module 112 able to cut off the electrical supply to the Wi-Fi modules concerned. In the example in FIG. 1, the electrical supply to each power amplifier of the Wi-Fi module 1052 is cut off. It is then considered that the Wi-Fi module 1052 is cut off since, without power amplification, its communication capabilities are very limited.

Following the implementation of step 86, the processor 101 implements a step 87 similar to step 84. During step 87, the processor 101 regularly checks whether the mains supply has been re-established. When the processor determines that the mains supply has been re-established, it passes to a step 88 that we explain hereinafter.

When, during step 84, the processor 101 determines that the mains supply has been re-established, the processor 101 implements step 88.

During step 88, as during step 64, each module 111 for detecting a break in mains supply instantaneously causes the reactivation of each hardware module cut off during step 82. Thus all the electrical supply circuits opened during step 82 are closed. During step 88, Wi-Fi modules (and the BSSs managed by these Wi-Fi modules) deactivated during step 82 or during step 86 are reactivated. In the example in FIG. 1, the Wi-Fi module 1052, which was deactivated, is reactivated during step 88.

During a step 89, which we detail hereinafter, the processor 101 causes a message transmission indicating to each remote item of equipment the BSS of which was deactivated that it has been reactivated. In the example in FIG. 1, the processor 101 causes the transmission of a message to the remote equipment 2C indicating to it that the BSS 3C is reactivated.

During steps 85 and 89, message communications are implemented between the gateway and at least one remote item of equipment to which the activation/deactivation of a Wi-Fi module relates in order to warn this remote item or items of equipment of the activation/deactivation of said Wi-Fi module.

These message communications can be implemented in unicast mode or even in multicast mode or in broadcast mode.

One advantage of the unicast approach (or respectively of the multicast approach) is that it makes it possible to deal with each remote item of equipment (or respectively a group of remote items of equipment) independently, not all the remote items of equipment having the same capabilities and therefore not supporting the same messages. One drawback of the unicast approach (or respectively of the multicast approach) is that it gives rise to an exchange of a large number of messages in order to address each remote item of equipment (or respectively each group of remote items of equipment), these (or respectively the remote items of equipment of the groups of remote items of equipment) also being able to respond according to the messages sent and thus increasing the traffic.

One advantage of the broadcast approach is that it is possible to minimise the number of messages to be sent. A drawback is that this message sent must be understood by each remote item of equipment concerned.

In one embodiment, the unicast approach uses BSS transmission messages (BSS transmission management), hereinafter referred to as BTM messages, introduced by IEEE amendment 802.11v. A Wi-Fi module supporting BTM messages knows whether a remote item of equipment also manages this type of message by virtue of information obtained during each association request between the remote item of equipment and a BSS managed by said Wi-Fi module. This is because a "BSS Transition Field" is then positioned at 1 in an "Extended Capabilities" item of information contained in the association request.

A Wi-Fi module supporting the BTM messages can send in unicast mode BTM Request frames defined in IEEE amendment 802.11v to each remote item of equipment that it wishes to inform of the deactivation of a BSS. By using the BTM Request messages, it is possible to inform a remote item of equipment of the imminent deactivation of a BSS by positioning an information bit "BSS Termination Included" in a "Request Mode" field of said message.

In the example in FIG. 1, the Wi-Fi module 1052 manages the BSS 3C. When there is a break in the mains supply, the Wi-Fi module 1052 transmits in unicast mode a BTM Request frame to the remote item of equipment 2C in which the "BSS Termination Included" information bit of the "Request Mode" field is positioned at "1". This frame informs the equipment 2C that the BSS 3C will be deactivated.

A Wi-Fi module supporting BTM messages can also indicate, in the BTM Request frames, a list indicating at least one BSS to which to migrate. This list may for example be a predefined list or a list supplied by the processor 101. This list comprises an identifier BSSID (BSS identifier) for each BSS to which it is advised to migrate with an associated priority. In the example in FIG. 1, the Wi-Fi module 1052 transmits, in unicast mode to the remote item of equipment 2C, a list of BSSs comprising the BSSID of the BSS 3A with maximum priority. Said list was for example supplied to the Wi-Fi module 1052 by the processor 101. The remote item of equipment 2C can then attempt to connect to the BSS 3A.

During step 89, the Wi-Fi module 1050 transmits a message in unicast mode to the equipment 2C informing it that the BSS 3C is re-established. It will be supposed for example that here the Wi-Fi module 1050 has been informed by the processor 101 of the reactivation of the Wi-Fi module 1052. The Wi-Fi module 1050 uses for this a BTM Request frame comprising the BSSID of the BSS 3C. However, in this step, the information bit "BSS Termination Included" of the field "Request Mode" is not positioned at "1".

In one embodiment, before a Wi-Fi module is cut off, the gateway 1 creates a temporary BSS responsible for receiving the remote items of equipment associated with the BSS on the point of being deactivated. When this temporary BSS is created, the gateway 1 (i.e. the processor 101) informs one of its Wi-Fi modules that it must create a temporary BSS and transmits, to this Wi-Fi module and for each remote item of equipment that is to migrate to the temporary BSS, an identifier, referred to as the migrating equipment identifier, enabling said Wi-Fi module to identify each remote item of equipment. Each migrating equipment identifier may for example be an MAC (medium access control) address of the remote equipment concerned. The Wi-Fi module chosen by the gateway 1 can advantageously configure the temporary BSS so that its associated beacon does not broadcast its associated network name (Service Set Identifier (SSID)) and has an open access policy in order to limit exchanges solely to the association procedure (no authentication). However, this temporary BSS responds only to requests (Probe Request, Association Request, etc messages as defined in the IEEE 802.11 protocols) coming from remote items of equipment identified by the Wi-Fi module chosen by the gateway 1 by means of the migrating equipment identifiers. Such an identification method makes it possible not to have to configure the remote items of equipment so that they have knowledge of this new temporary BSS. Moreover, not broadcasting the SSID enables remote items of equipment currently searching for a BSS to which to connect and not connected to the gateway implementing the invention (e.g. equipment of a neighbour), not to present the identifier of the temporary BSS created as a search result to the users of said remote equipment. In this embodiment, the Wi-Fi module intended to be deactivated transmits, in its BTM Request frames, the identifier of the temporary BSS managed by the Wi-Fi module chosen by the gateway 1.

In the example in FIG. 1, the Wi-Fi module chosen by the gateway managing the temporary BSS is the Wi-Fi module 1050. During step 85, the gateway 1 informs the Wi-Fi module 1050 that it will have to create a temporary BSS and supplies to it the identifier of the remote item of equipment 2C. The Wi-Fi module 1052 transmits to the remote item of equipment 2C a BTM Request frame comprising the identifier of the temporary BSS.

In this embodiment, during step 89, the Wi-Fi module 1050, informed of the reactivation of the Wi-Fi module 1052 for example by the processor 101, transmits a BTM Request frame to the remote item of equipment 2C informing it of the imminent deactivation of the temporary BSS and inviting it to migrate either to its original BSS (i.e. the BSS 3C) or to another BSS such as the BSS 3A. The temporary BSS is then deactivated by the gateway 1 (i.e. by the processor 101).

In this embodiment, the remote equipment affected by a stoppage of a BSS does not support the BTM messages. In this case, in the event of a mains supply cut, a dissociation message is sent to the remote item of equipment relating to the Wi-Fi module on the point of being deactivated. No further probe request or association request is then managed by the Wi-Fi module intended to be deactivated. In this embodiment, it is possible to enable the gateway 1 to save the identifiers of each remote item of equipment associated with the BSS managed by the Wi-Fi module intended to be deactivated. These saved identifiers can be used by the gateway 1 to enable an active Wi-Fi module of the gateway 1 to reply as a priority to the information/association requests emanating from the remote items of equipment corresponding to these identifiers if they attempt to migrate to a BSS managed by said active Wi-Fi module of the gateway 1.

In the example in FIG. 1, the Wi-Fi module 1052 transmits a message of disassociation from the BSS 3C to the remote item of equipment 2C and saves the identifier of the remote item of equipment 2C. Following this disassociation, when the remote item of equipment 2C attempts to associate itself with the BSS 3A, it is treated as a priority by the Wi-Fi module 1050.

When the mains supply returns, the Wi-Fi module 1052 (and the BSS 3C) are reactivated, each remote item of equipment then being free to associate itself therewith. No action is implemented by the reactivated Wi-Fi module 1052 (i.e. in this case step 89 is not implemented by the processor 101).

In one embodiment, messages transmitted in broadcast mode are used. It is known that a remote item of equipment where the BSS with which it is associated is deactivated seeks a new BSS with which to associate (either passively by seeking beacons or actively by sending a probe request. In order to assist this remote item of equipment in more quickly finding a channel where a BSS to which it can migrate is situated, it is possible for a Wi-Fi module that is to be deactivated to announce a change in channel by means of an item of CSA (channel switch announcement) information that can be broadcast either in a dedicated management frame or in a beacon associated with the BSS with which said remote item of equipment is associated. In both cases, the CSA information is broadcast in broadcast mode.

The CSA information indicates the channel on which the BSS to which to migrate is operating and when this change in channel should take place. Positioning a remote item of equipment on the channel on which the BSS to which it must migrate is operating makes it possible to accelerate the migration. This is because the remote item of equipment, during its search for a new BSS, has a great chance of beginning with this channel in order to perform operations necessary for a recovery of connectivity (passive search for beacons, Probe Request, etc.). In this embodiment, the gateway may further save the identifiers of the remote items of equipment associated with the deactivated Wi-Fi module (and with the deactivated BSS). The Wi-Fi module managing the BSS (existing or temporary as described above) to which the remote items of equipment are invited to migrate can then use these identifiers in order to respond as a priority to their information/association request.

In the example in FIG. 1, the Wi-Fi module 1052 transmits CSA information indicating the channel on which the BSS 3A is operating and when the change in channel should take place in a beacon and in broadcast mode. The remote item of equipment 3C receiving this beacon positions itself on the channel indicated and performs the operations necessary for seeking connectivity in order to associate itself with the BSS 3A.

In another embodiment, a new information item is introduced into a beacon in order to inform remote items of equipment of the deactivation of a BSS and to invite these remote items of equipment to migrate to another BSS (existing or temporary as described above) identified by its BSSID. This information item includes for example fields of the frame BTM Request such as the termination fields of the BSS, the time of termination and a list of candidate BSSs defined in IEEE amendment 802.11v. Once the beacon has been received, each remote item of equipment associated with a BSS intended to be activated disconnects from this BSS and attempts to reassociate with the BSS indicated in the information.

In one embodiment, rather than introducing information contained in BTM Request frames in beacons, BTM Request frames previously described as transmitted in unicast mode are transmitted in broadcast mode.

In the event of return of the mains supply, the remote items of equipment that migrated can once again migrate to their original BSS when the corresponding Wi-Fi module is started up again. One advantage of using a temporary BSS is that it is possible to minimise the number of messages to be transmitted in order to make migrate all the remote items of equipment that migrated to the temporary BSS when the mains supply was cut off. According to the embodiment, if all the items of equipment that migrated support the reception of the BTM Request frame sent in broadcast mode as proposed in the present invention or the reception of the information equivalent to the BTM request frame added in the beacons as proposed in the present invention, then the migration to the original BSS can take place in a controlled manner by the sending of the associated frame (either a BTM Request frame or a beacon containing the information element equivalent to the BTM Request frame) in broadcast mode.

If only some items of equipment that migrated support the BTM Request frame sent in unicast mode, then the migration to the original BSS can take place in a controlled manner by the sending of the associated frame (BTM Request) in unicast mode to each of these items of equipment. For the remaining items of equipment, the conventional end of BSS announcement is used by indicating in the beacon the next termination of said temporary BSS. The variant based on the CSA can also be implemented reciprocally.

In the case of migration to an existing BSS, the migration to the original BSS will have to take place on a case-by-case basis in order not to also make migrate the remote items of equipment which, before the cutting of the mains supply, were associated with the existing BSS. The unicast BTM Request or disassociation approaches are then used according to the capabilities of the equipment to migrate.

It should be noted that, until now, we have considered that a Wi-Fi module that creates a temporary BSS for accommodating remote items of equipment associated with a BSS intended to be deactivated creates a new BSS without a link with the deactivated BSS. In one embodiment, it is possible to recreate a BSS that is similar or even identical to the deactivated BSS by taking session information, or even buffers associated with the remote items of equipment connected to the deactivated BSS. This embodiment has the advantage of avoiding loss of a current Wi-Fi session.

In one embodiment, the broadcast approach is used at each detection of a break in the mains supply in order to minimise the number of transmissions of messages by the gateway 1 (and therefore to increase the self-sufficiency of the gateway 1), while the unicast approach (or respectively the multicast approach) may be favoured on the detection of a return of the mains supply, in order for example to migrate first the remote items of equipment best responding to the BTM messages. In the case of a new break occurring in full migration, these remote items of equipment can in fact be repatriated more easily through their support of the BTM messages.

The invention claimed is:

1. A system for managing electrical consumption in an appliance comprising a battery protected by an emergency fuse able to withstand a maximum supply current to the appliance for a predefined period, the appliance being able to be supplied electrically by a mains supply or by the battery, the battery supply being intended to take over from the mains supply in the event of a break in the mains supply, the system comprising
circuitry adapted for detecting a break in the mains supply and
circuitry adapted for reducing the electrical consumption of the appliance, wherein:
the circuitry adapted for detecting a break in the mains supply and the circuitry adapted for reducing the electrical consumption of the appliance are configured to be used independently of any interpretation of machine instructions and to react in a time less than the predefined period, the circuitry adapted for reducing the electrical consumption of the appliance allowing to obtain a predefined reduction in electrical consumption of the appliance ensuring that the appliance consumes a supply current smaller than the maximum supply current that the safety fuse can withstand.

2. The system according to claim 1, wherein the circuitry for detecting a break in the mains supply comprise circuitry adapted for comparing the voltage representing a supply voltage of the appliance with a predefined reference voltage, a break in the mains supply being detected when the predefined reference voltage is higher than the voltage representing the supply voltage of the appliance.

3. The system according to claim 1, wherein the circuitry for reducing the electrical consumption of the appliance are controlled by the circuitry for detecting a break in the mains supply and open an electrical supply circuit of at least one predefined hardware module included in the appliance when a break in the mains supply is detected.

4. The system according to claim 3, wherein the electrical supply circuit of a hardware module of the appliance can be opened by the circuitry adapted for reducing the electrical consumption only when a module of the appliance, referred to as a lock, associated with this hardware module is in an activated mode and cannot be opened when said lock is in a deactivated mode, each lock being configured in the activated or deactivated mode by a processor of the appliance using machine instructions.

5. The system according to claim 3, wherein, following the opening of the supply circuit of each predefined hardware module allowing to obtain the predefined reduction in electrical consumption of the appliance, the processor is able to cause the opening of the supply circuit of other hardware modules of the appliance.

6. A method for managing electrical consumption in an appliance comprising a battery protected by a safety fuse able to withstand a maximum supply current of the appliance for a predefined period, the appliance being able to be supplied electrically by a mains supply or by the battery, the supply by the battery being intended to take over from the mains supply in the event of a break in the mains supply, wherein the method comprises the following steps implemented independently of any interpretation of machine instructions in a time less than the predefined period:

detecting a break in mains supply; and cutting off the electrical supply of at least one hardware module of the appliance so as to obtain a predefined reduction in electrical consumption of the appliance ensuring that the appliance consumes a supply current lower than the maximum supply current that the safety fuse can withstand.

7. The method according to claim 6, wherein the appliance comprises a plurality of wireless communication modules each managing at least one wireless communication connection, each wireless connection being associated with at least one remote item of equipment, the method comprising:

checking whether the mains supply of the appliance is re-established;

when the mains supply is not re-established:

obtaining information representing a first wireless communication module that may be cut off and transmitting, to each remote item of equipment associated with a wireless connection managed by the first wireless communication module, a message comprising information representing said wireless connection;

cutting off the electrical supply to the first wireless communication module; and regularly checking whether the mains supply has been re-established.

8. The method according to claim 7, wherein said message further comprises a list indicating, to each remote item of equipment associated with a wireless connection managed by the first wireless communication module, at least one wireless connection to migrate to.

9. The method according to claim 8, wherein the wireless connection to migrate to is an existing wireless connection managed by a second wireless communication module or a temporary wireless connection created by a second wireless communication module following the detection of the break in mains supply.

10. The method according to claim 9, wherein the method further comprises: saving an identifier of each remote item of equipment associated with a wireless connection managed by the first wireless communication module; and using the saved identifiers to enable a second wireless communication module to treat as a priority each remote item of equipment to which said identifiers relate if they attempt to migrate to a wireless connection managed by said second wireless communication module.

11. The method according to claim 7, wherein, when the mains supply is re-established, the method further comprises:

allowing the electrical resupply of each hardware module of the appliance cut off when the break in the mains supply is detected; and transmitting a message to each remote item of equipment involved in the break in mains supply of the first wireless communication module indicating that each wireless connection managed by the first wireless communication module has been reactivated.

12. The method according to claim 7, wherein each message is transmitted to each remote item of equipment involved in the cutting off of the first wireless communication module according to a unicast communication mode or according to a multicast communication mode or according to a broadcast communication mode.

13. The method according to claim 12, wherein the broadcast communication mode is used when a break in mains supply is detected, and the unicast communication mode or the multicast communication mode is used when a reestablishment of the mains supply is detected.

14. An appliance comprising a system according to claim 1 and comprising circuitry adapted for implementing the method according to claim 7.

15. Non transitory storage medium, storing program code instructions which can be loaded in a programmable device to cause said programmable device to implement, the method according to claim 7 when the program code instructions are run by the programmable device.

* * * * *